(12) United States Patent
Serrano et al.

(10) Patent No.: US 7,092,579 B2
(45) Date of Patent: Aug. 15, 2006

(54) CALCULATING NOISE ESTIMATES OF A DIGITAL IMAGE USING GRADIENT ANALYSIS

(75) Inventors: Navid Serrano, Rochester, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 859 days.

(21) Appl. No.: 10/151,623

(22) Filed: May 20, 2002

(65) Prior Publication Data

US 2003/0215155 A1    Nov. 20, 2003

(51) Int. Cl.
 *G06K 9/40*  (2006.01)
(52) U.S. Cl. .................. 382/254; 382/274; 382/275; 358/3.26; 358/520
(58) Field of Classification Search ........... 382/260, 382/274, 275; 358/3.26, 3.27, 519, 520
See application file for complete search history.

(56) References Cited

U.S. PATENT DOCUMENTS

| 5,081,692 | A  |   | 1/1992  | Kwon et al.    |          |
|-----------|----|---|---------|----------------|----------|
| 5,473,384 | A  | * | 12/1995 | Jayant et al.  | 348/470  |
| 5,809,178 | A  |   | 9/1998  | Anderson et al.|          |
| 5,923,775 | A  |   | 7/1999  | Snyder et al.  |          |
| 5,932,775 | A  | * | 8/1999  | Lacroix et al. | 570/122  |
| 6,118,906 | A  | * | 9/2000  | Keyes et al.   | 382/266  |
| 6,330,353 | B1 | * | 12/2001 | Lai et al.     | 382/147  |
| 6,442,203 | B1 | * | 8/2002  | Demos          | 375/240.16 |
| 6,462,768 | B1 | * | 10/2002 | Oakley         | 348/31   |

OTHER PUBLICATIONS

"Digital Image Smoothing and the Sigma Filter" by Jong-Sen Lee, Computer Vision, Graphics, and Image Processing vol. 24, pp. 255-269, 1983.

* cited by examiner

*Primary Examiner*—Samir Ahmed
*Assistant Examiner*—Yosef Kassa
(74) *Attorney, Agent, or Firm*—Raymond L. Owens (57) ABSTRACT

A method of estimating the noise in a digital image for use in subsequent image processing, includes receiving a source digital image having a plurality of pixels; selecting a pixel of interest; providing a plurality of orientations for the pixel of interest; using gradient analysis on the source digital image and the plurality of orientations to select the most suitable orientation for estimating noise for the pixel of interest; using the selected orientation in the pixel of interest to determine a noise-free pixel estimate for the pixel of interest; and repeating for other pixels of interest and using the noise-free pixel estimates to calculate a noise characteristic value representing the noise estimate for the source digital image.

14 Claims, 4 Drawing Sheets

CALCULATING NOISE ESTIMATES OF A DIGITAL IMAGE USING GRADIENT ANALYSIS

FIELD OF INVENTION

The present invention relates to providing noise estimates that can be used to remove noise from digital images.

BACKGROUND OF THE INVENTION

Some digital image processing applications designed to enhance the appearance of digital images take explicit advantage of the noise characteristics associated with the digital images. For example, Keyes et al. in U.S. Pat. No. 6,118,906 describe a method of sharpening digital images which includes the steps of measuring the noise components in the digital image with a noise estimation system to generate noise estimates and sharpening the digital image with an image sharpening system which uses the noise estimates. Similarly, digital imaging applications have incorporated automatic noise estimation methods for the purpose of reducing the noise in the processed digital images as in the method described by Anderson et al. in U.S. Pat. No. 5,809,178.

In commonly-assigned U.S. Pat. No. 5,923,775, Snyder et al. disclose a method of image processing which includes a step of estimating the noise characteristics of a digital image and using the estimates of the noise characteristics in conjunction with a noise removal system to reduce the amount of noise in the digital image. The method described by Snyder et al. is designed to work for individual digital images and includes a multiple step process for the noise characteristics estimation procedure. A first residual signal is formed from the digital image obtained by applying a spatial filter. This first residual is analyzed to form a mask signal which determines what regions of the digital image are more and less likely to contain image structure content. The last step includes forming a second residual signal and sampling the second residual signal in the image regions unlikely to contain image structure as indicated by the first residual signal. The method taught by Snyder et al. requires the use of the mask signal to produce accurate noise estimates due to the fact that the spatial filter used to calculate the second residual image does not fully filter the image structure content.

It is desirable in any noise estimation method to obtain a residual signal that is pure noise, with no image structure content. This will lead to more accurate estimation of the noise characteristics in the image. Existing techniques suffer from the problem of image structure contamination in the residual signal used to estimate the noise. In other words, the spatial filter that produces the residual signal does not fully filter out image structure. The masking technique cannot fully exclude image structure pixels from the residual signal.

SUMMARY OF THE INVENTION

It is an object of the present invention to provide a noise estimates for a digital image that can be used in subsequent processing to enhance digital images.

It is a further object of the present invention to provide for noise reduction and spatial sharpening processing of a digital image that uses the noise estimates.

These objects are achieved by a method of estimating the noise in a digital image for use in subsequent image processing, comprising the steps of:

a) receiving a source digital image having a plurality of pixels;
b) selecting a pixel of interest;
c) providing a plurality of orientations for the pixel of interest;
d) using gradient analysis on the source digital image and the plurality of orientations to select the most suitable orientation for estimating noise for the pixel of interest;
e) using the selected orientation in the pixel of interest to determine a noise-free pixel estimate for the pixel of interest; and
f) repeating steps b)–e) for other pixels of interest and using the noise-free pixel estimates to calculate a noise characteristic value representing the noise estimate for the source digital image.

It is an advantage of the present invention that by using gradient analysis as a feature of a noise estimation spatial filter that a noise characteristic value representing an estimate of the magnitude of noise present in the digital image can be computed and used to remove noise from the digital image. It is a further advantage of the present invention that the noise characteristic value can be used to enhance the spatial detail of a digital image while minimizing the amplification of the noise.

DETAILED DESCRIPTION OF THE INVENTION

In the following description, a preferred embodiment of the present invention will be described as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
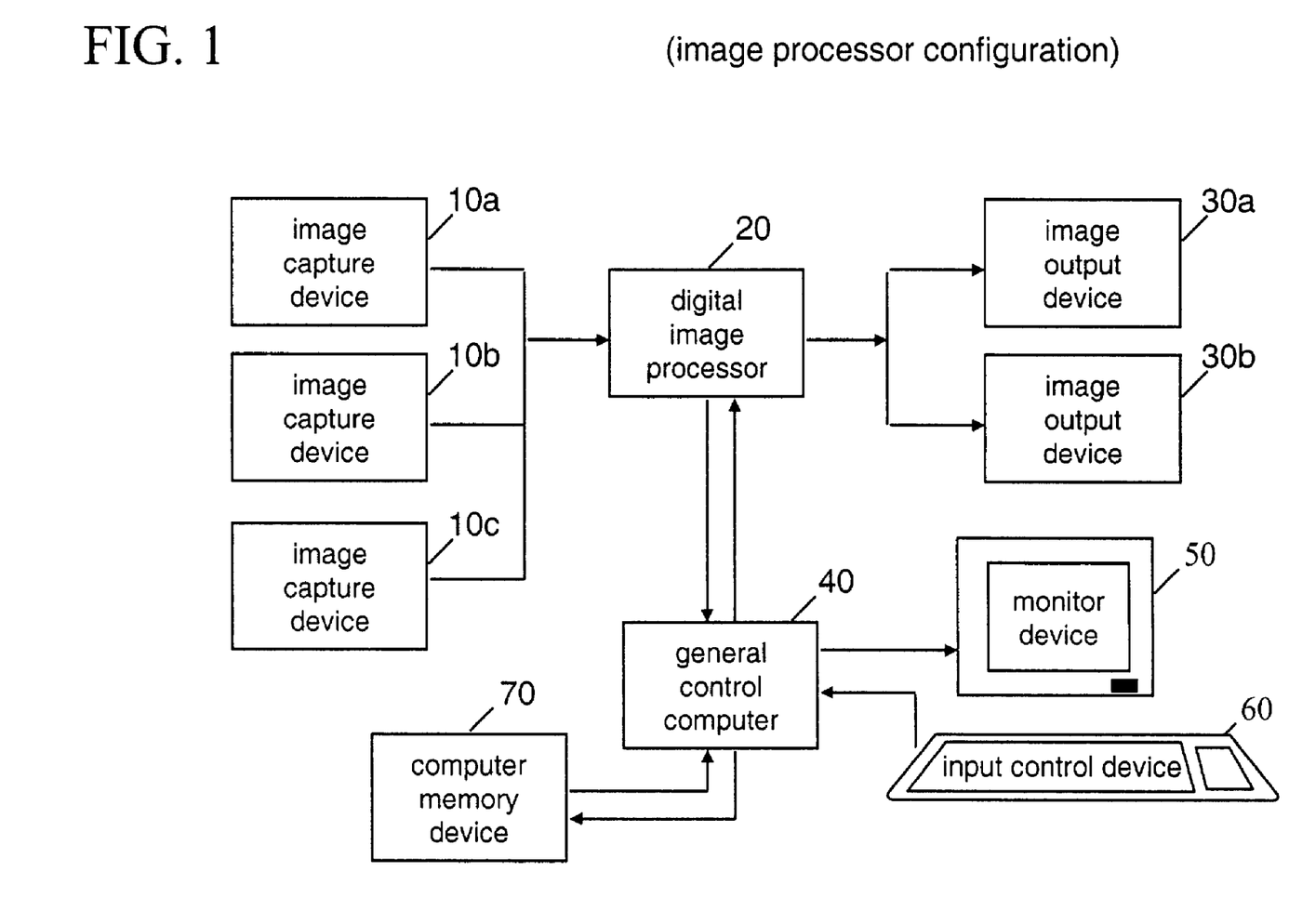
FIG. 1 is a functional block diagram of a digital image processing system suitable for practicing the present invention.

The present invention can be implemented in computer hardware. Referring to FIG. 1, the following description relates to a digital imaging system which includes an image capture device 10a, an digital image processor 20, an image output device 30a, and a general control computer 40. The system can include a monitor device 50 such as a computer console or paper printer. The system can also include an input device control 60 for an operator such as a keyboard and or mouse pointer. Multiple capture devices 10a, 10b, and 10c are shown illustrating that the present invention can be used for digital images derived from a variety of imaging devices. For example, FIG. 1 can represent a digital photofinishing system where the image capture device 10a is a conventional photographic film camera for capturing a scene on color negative or reversal film combined with a film scanner device for sensing the developed image on the film and producing a digital image. Although the term "scanner" can refer to digital imaging devices that physically scan or move a sensing element past a photographic film sample, the present invention also includes photographic film scanners and print scanners that employ a stationary image sensing device to generate a digital image. The digital image processor 20 provides the means for processing the digital images to produce pleasing looking images on the intended output device or media. Multiple image output devices 30a and 30b are shown illustrating that the present invention can be used in conjunction with a variety of output devices which can include a digital photographic printer and soft copy display. The digital image processor 20 processes the digital image to adjust the overall brightness, tone scale, image structure etc. of the digital image in a manner such that a pleasing looking image is produced by an image output device 30a. Those skilled in the art will recognize that the present invention is not limited to just these mentioned image processing modules.

The general control computer 40 shown in FIG. 1 can store the present invention as a computer program stored in a computer readable storage medium, which can include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention can also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention implemented in a combination of software and/or hardware is not limited to devices which are physically connected and/or located within the same physical location. One or more of the devices illustrated in FIG. 1 can be located remotely and can be connected via a wireless connection.

A digital image includes one or more digital image channels. Each digital image channel includes a two-dimensional array of pixels. Each pixel value relates to the amount of light received by the image capture device 10a corresponding to the geometrical domain of the pixel. For color imaging applications a digital image will typically consist of red, green, and blue digital image channels. Other configurations are also practiced, e.g. cyan, magenta, and yellow digital image channels. Motion imaging applications can be thought of as a time sequence of digital images. Those skilled in the art will recognize that the present invention can be applied to, but is not limited to, a digital image channel for any of the above mentioned applications. Although the present invention describes a digital image channel as a two dimensional array of pixel values arranged by rows and columns, those skilled in the art will recognize that the methodology of the present invention can be applied to mosaic (non rectilinear) arrays with equal effect.

Figure 2:
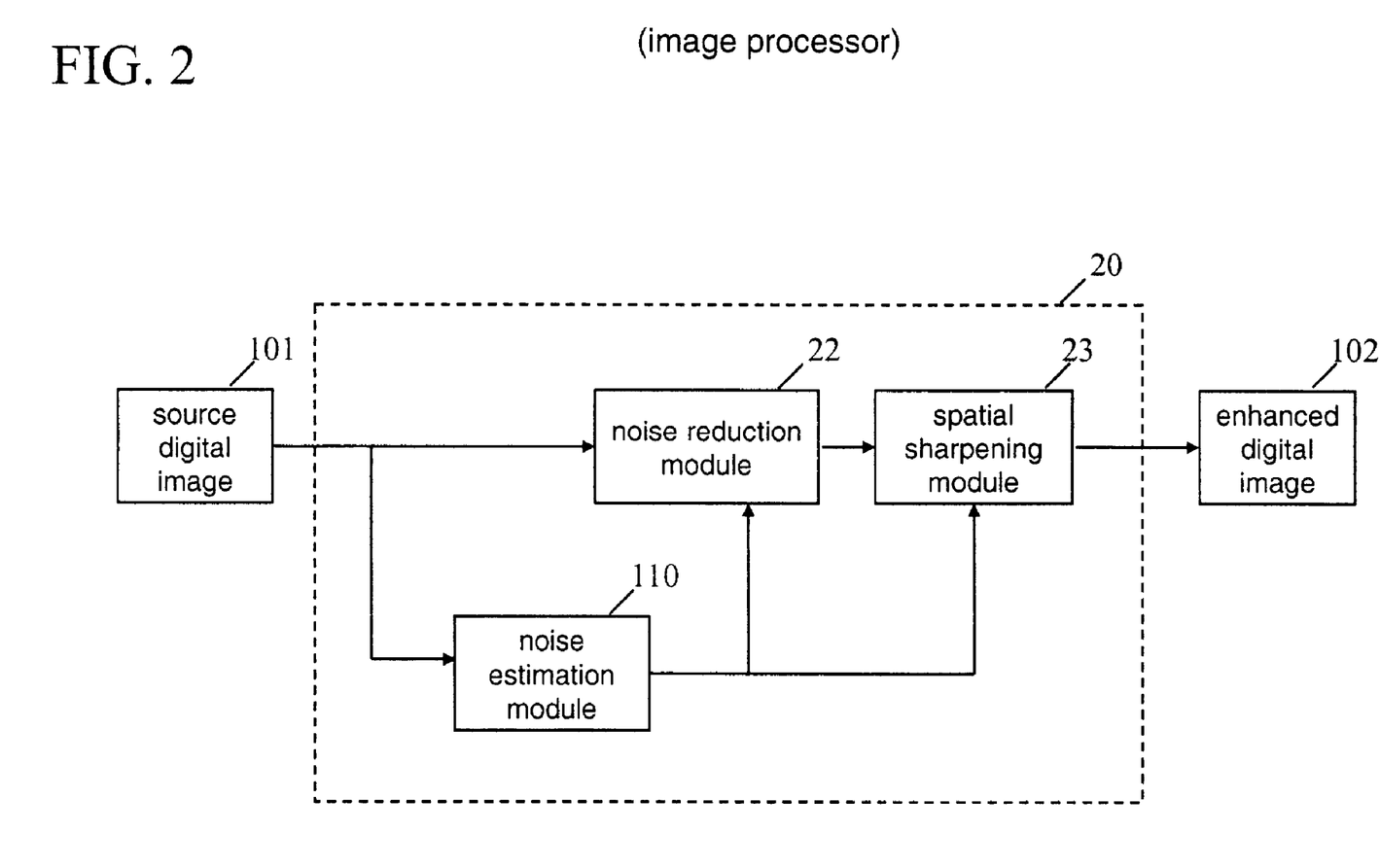
FIG. 2 is a functional block diagram showing the details of the digital image processor shown in FIG. 1.

The digital image processor 20 shown in FIG. 1 is illustrated in more detail in FIG. 2. The general form of the digital image processor 20 employed by the present invention is a cascaded chain of image processing modules. A source digital image 101 is received by the digital image processor 20 which produces on output an enhanced digital image 102 and a noise characteristic table 105, i.e. a table of noise characteristic values representing estimates of the noise magnitude for the source digital image. A noise estimation module 110 receives the source digital image 101 and produces the noise characteristic table 105. Each image processing module contained within the digital image processor 20 receives a digital image, modifies the digital image, produces a processed digital image and passes the processed digital image to the next image processing module. The two enhancement transform modules shown within the digital image processor 20 are a noise reduction module 22 and a spatial sharpening module 23. These two modules use the noise characteristic table 105 produced by the noise estimation module 110 to produce the enhanced digital image 102. Those skilled in the art will recognize that any other image processing module that utilizes a noise characteristic table can be used with the present invention.

Figure 3:
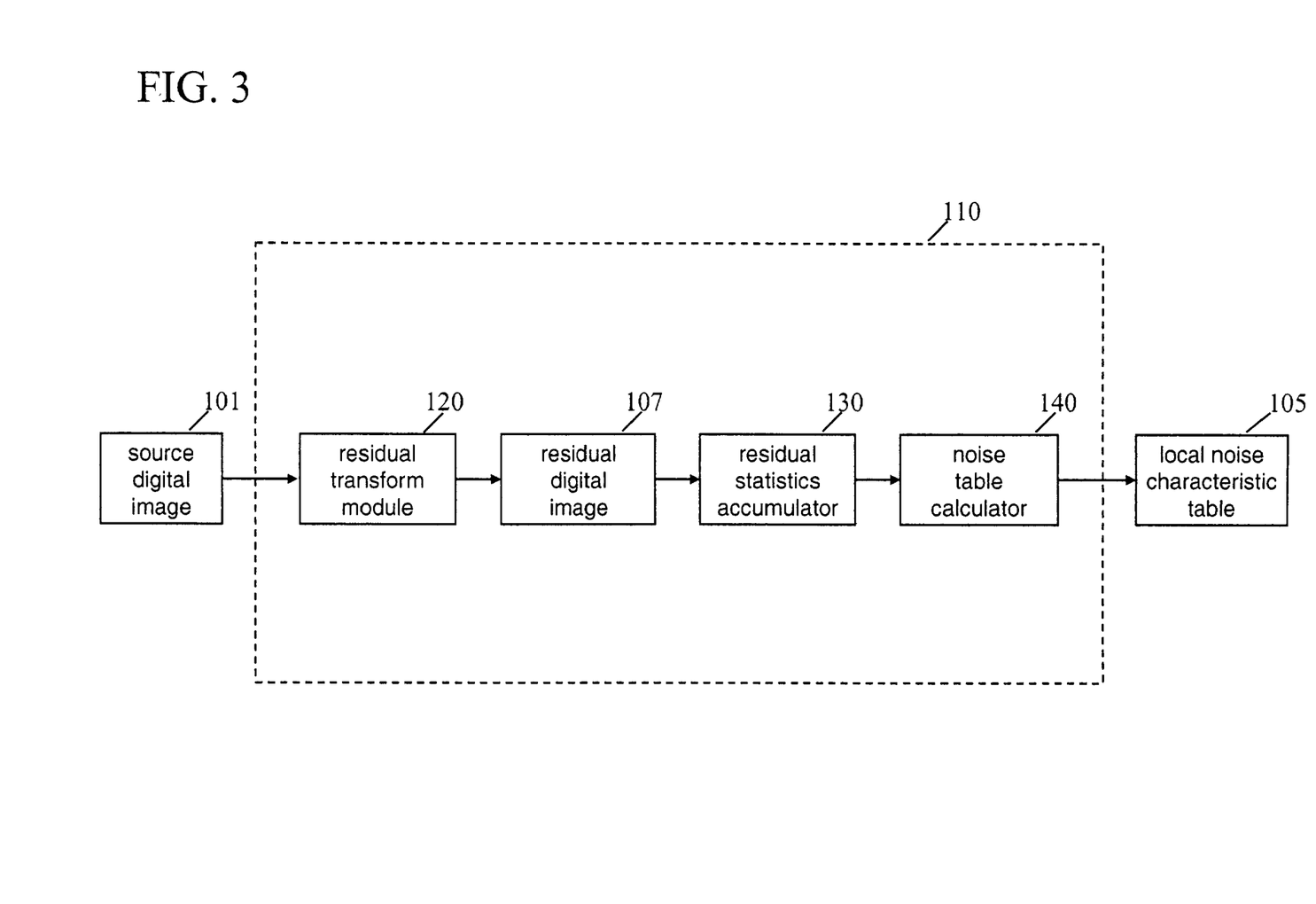
FIG. 3 is a function block diagram showing the details of the noise estimation module shown in FIG. 2.

The noise estimation module 110 shown in FIG. 2 is illustrated in more detail in FIG. 3. The source digital image 101 includes pixels corresponding to one or more different colors and typically includes three digital image channels that have pixels corresponding to red, green, and blue colors. The residual transform module 120 receives the source digital image 101 and uses spatial filters and the pixel data of the source digital image 101 to calculate a residual digital image 107, i.e. a residual pixel value corresponding to each original pixel value in the source digital image 101. Thus the residual digital image 107 includes pixels having values corresponding to the one or more different colors of the source digital image 101. A residual statistics accumulator 130 receives the residual digital image 107 and calculates a set of residual histograms from the residual digital image 107. A noise table calculator 140 receives the set of residual histograms and produces a noise characteristic table 105.

The residual transform module 120 performs a spatial filtering operation on the pixel data of the source digital image 101. That is, a residual pixel value is generated for each selected pixel of interest in the source digital image 101. In general, all or nearly all of the pixels of the source digital image 101 are selected as pixels of interest. However, it is important to note that the present invention can be practiced using a subset of the pixels of the source digital image 101 and still produce accurate noise characteristic tables. For each pixel of interest, a collection of pixel values sampled in a local region about the pixel of interest is used to calculate two or more noise-free pixel estimates for the pixel of interest. A final noise-free pixel estimate is chosen and the residual pixel value is calculated as the difference between the final noise-free pixel estimate and the value of the pixel of interest. The residual transform module 120 performs the spatial filtering operation on each color digital image channel individually and forms a residual pixel value for each pixel of each color digital image channel. That is, the spatial filtering operation of the red pixel values does not use the green pixel values and vice versa. The process is described mathematically below.

Let g(x,y) describe the array of pixel values corresponding to an individual color digital image channel of the source digital image 101. Assuming the color digital image channel is affected by an additive noise source, g(x,y) can be defined in terms of a noise component n(x,y) and a signal component f(x,y) given by (1).

$$g(x,y)=f(x,y)+n(x,y) \qquad (1)$$

An estimate of the signal component f(x,y) is obtained using a spatial filter. The noise component n(x,y) is then obtained by computing the difference between g(x,y) and the signal component f(x,y). The effectiveness of the overall noise estimation process depends largely on the effectiveness of the spatial filter used. The better the approximation of f(x,y), the better the estimate of the noise component n(x,y). Ultimately, the goal is to produce a noise component (the residual digital image 107), n(x,y), that is composed exclusively of noise. That is, there should be no image structure signal content in the residual digital image 107.

The preferred embodiment of the present invention uses gradient analysis on the pixels of the source digital image 101 to select the most suitable orientation for estimating noise for a pixel of interest. The gradient analysis is performed by applying four spatial filters each of which intersects with the pixel of interest to obtain four directional intensity gradient values in a local region sampled about the pixel of interest. The four spatial filters represent a plurality of orientations for the pixel of interest since each has a different implied orientation with regard to edge detection. Specifically, the four spatial filters provide a measure of the signal gradient in four spatial directions oriented about the pixel of interest: 0, 90, 45, and 135 degrees. The four spatial filters used to obtain the directional intensity gradient values are given as:

$$h_0 = \begin{bmatrix} -1 & -2 & -1 \\ 0 & 0 & 0 \\ 1 & 2 & 1 \end{bmatrix} \qquad (2)$$

$$h_{90} = \begin{bmatrix} -1 & 0 & 1 \\ -2 & 0 & 2 \\ -1 & 0 & 1 \end{bmatrix} \qquad (3)$$

$$h_{45} \begin{bmatrix} 2 & 1 & 0 \\ 1 & 0 & -1 \\ 0 & -1 & -2 \end{bmatrix} \qquad (4)$$

$$h_{135} \begin{bmatrix} 0 & 1 & 2 \\ -1 & 0 & 1 \\ -2 & -1 & 0 \end{bmatrix} \qquad (5)$$

The spatial filter of equation (2) produces a directional intensity gradient value for the 0 degree direction, the spatial filter of equation (3) produces a directional intensity gradient value for the 90 degree direction, the spatial filter of equation (4) produces a directional intensity gradient value for the 45 degree direction, and the spatial filter of equation (5) produces a directional intensity gradient value for the 135 degree direction. For a given pixel of interest $g(x_0,y_0)$, the directional intensity gradient value corresponding to the 45 degree orientation, $g'_{45}(x_0,y_0)$ is calculated by convolving the spatial filter of equation (4) with the source digital image as:

$$g'_{45}(x_0, y_0) = \sum_{i=-1}^{1} \sum_{j=-1}^{1} g(x_0 - i, y_0 - j) h_{45}(i, j) \qquad (6)$$

where $g'_{45}(x_0,y_0)$ is the estimate of the intensity gradient in the 45 degree orientation at pixel of interest $g(x_0,y_0)$. Similarly, the directional intensity gradient values for the other spatial orientations are calculated by substituting the corresponding spatial filter for the $h_{45}(i,j)$ term of equation (6). The spatial filters described in equations (2) through (5) are the well-known, Sobel gradient filters. Those skilled in the art will recognize that other analogous gradient detecting spatial filters exist and can be used to calculate the directional intensity gradient values. For instance the following two simple spatial filters could be used instead of those shown in equations (2)–(5):

$$h_{90}=[-1 \ 0 \ 1] \qquad (7)$$

$$h_0=h_{90}^T \qquad (8)$$

where the spatial filter, $h_0$, is given as the transpose of $h_{90}$, as shown in equation (8). The spatial filters shown in equations (7)–(8) are much simpler to implement and represent spatial filters that can be used to calculate two directional intensity gradient values for the spatial orientation directions 0 and 90 degrees. Another example of a set of spatial filters that can be used are the Sobel spatial filters that are the same as described by (2), (3), (47), and (5) with the exception that elements with values of 2.0 are replaced with a value of 1.0.

An important aspect of the present invention is the use of multiple directional intensity gradient values calculated for different spatial directions. The underlying image structure, represented by f(x,y), very often exhibits spatial correlation along a particular direction. The goal is to obtain the most robust estimate of f(x,y) and thus eliminate the noise. Similarly, for noise estimation purposes, a robust estimate of f(x,y) ensures that n(x,y) contains no residual spatial structure from f(x,y). In other words, the key is to differentiate the noise from the spatial structure. Given that noise is generally of high spatial frequency, noise can be easily differentiated from spatial structure when the spatial structure is of low spatial frequency. Experimentation with natural images has shown that the local gradient (i.e. in the vicinity of a pixel of interest) can be a good indication of the spatial frequency of the underlying spatial structure. In particular, the magnitude of a directional intensity gradient value can be used as in indication of the orientation of the underlying spatial structure. Therefore, the directional intensity gradient value of minimum magnitude, i.e. the minimum absolute value, indicates the direction for which the spatial structure is of lowest spatial frequency. Thus a robust noise estimate is obtained by selecting the preferred spatial orientation based on the minimum magnitude directional intensity gradient value.

It should also be noted that in the above mentioned gradient spatial filters that the value of the pixel of interest is not used in the calculation of the directional intensity gradient values. Therefore, each directional intensity gradient value is independent from the value of the pixel of interest.

Having applied the spatial filters of equations (2)–(5) to the image pixel data, we now have four directional intensity gradient values calculated for the pixel of interest. We will then use the directional intensity gradient values to select a preferred spatial orientation for the pixel of interest. The selected preferred spatial orientation is then used to calculate a noise-free pixel estimate for the pixel of interest relating to the signal f(x,y). The noise-free pixel estimate for the pixel of interest is calculated using the values of pixels sampled about the pixel of interest. Experimentation with digital image data has shown that the accuracy of the noise estimation process is improved for image regions characterized by low signal modulation. Therefore, the present invention calculates the noise-free pixel estimate by preferentially weighting the pixels along the direction indicated by the preferred spatial orientation, i.e. the direction corresponding to the lowest spatial frequency modulation. Using the four directional intensity gradient values, we use the following logic to obtain the noise-free pixel estimate:

If max $\{g'_0(x_0,y_0), g'_{90}(x_0,y_0), g'_{45}(x_0,y_0), g'_{135}(x_0,y_0)\}=g'_0(x_0,y_0)$,
then $$f(x_0, y_0) = \frac{1}{3}(A_4 + A_5 + A_6)$$

Else, if max $\{g'_0(x_0,y_0), g'_{90}(x_0,y_0), g'_{45}(x_0,y_0), g'_{135}(x_0,y_0)\}=g'_{90}(x_0,y_0)$,
then $$f(x_0, y_0) = \frac{1}{3}(A_2 + A_5 + A_8)$$

Else, max $\{g'_0(x_0,y_0), g'_{90}(x_0,y_0), g'_{45}(x_0,y_0), g'_{135}(x_0,y_0)\}=g'_{45}(x_0,y_0)$,
then $$f(x_0, y_0) = \frac{1}{3}(A_3 + A_5 + A_7)$$

Figure 4:
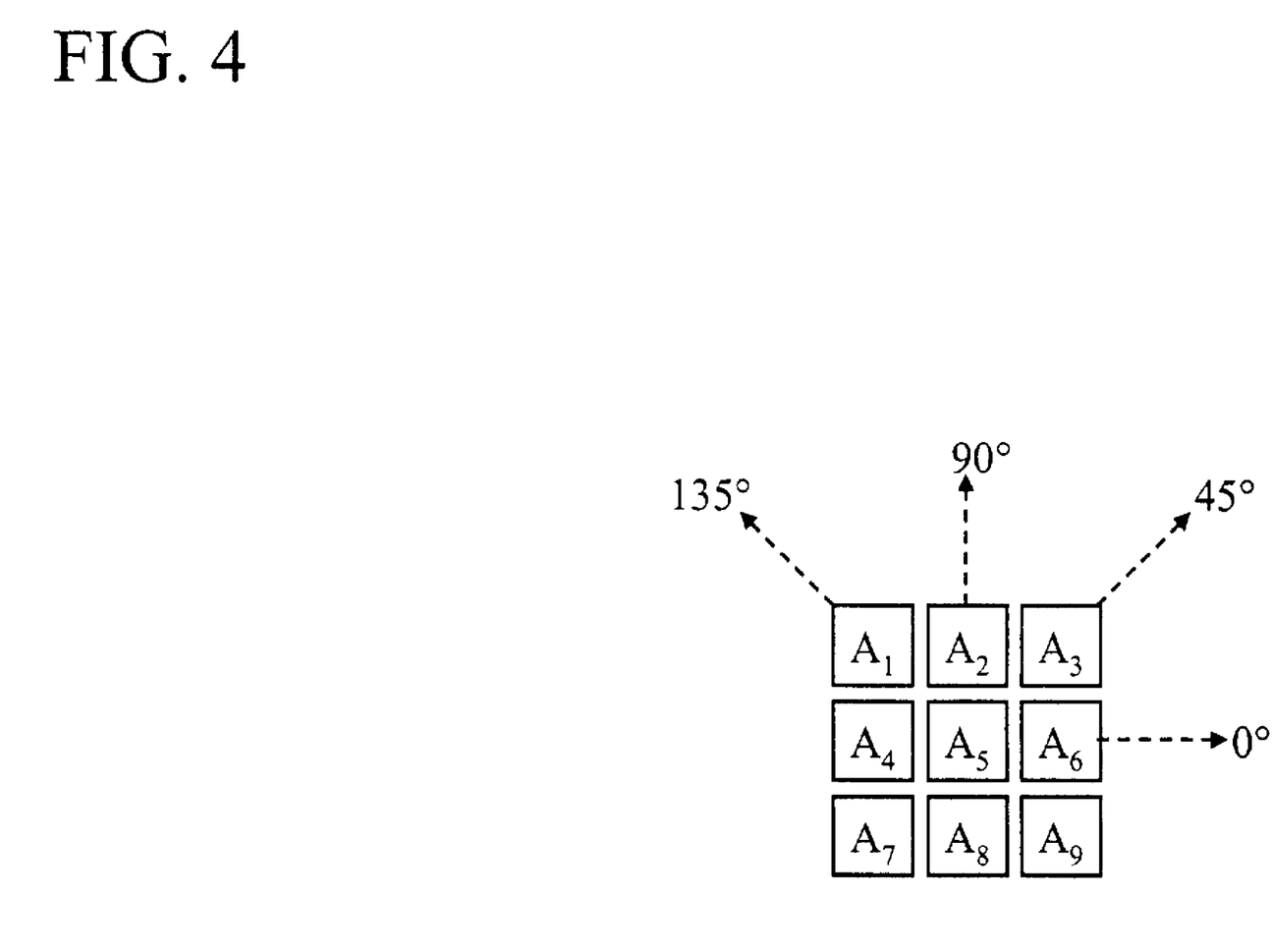
FIG. 4 is a diagram showing the arrangement of the pixels in a local region about a pixel of interest used to calculate the noise free pixel estimate.

Else, max $\{g'_0(x_0,y_0), g'_{90}(x_0,y_0), g'_{45}(x_0,y_0), g'_{135}(x_0,y_0)\}=g'_{135}(x_0,y_0)$,
then $$f(x_0, y_0) = \frac{1}{3}(A_1 + A_5 + A_9)$$

where the values $A_1$ through $A_9$ shown above are pixels in a local region sampled about the pixel of interest and $f(x_0,y_0)$ is the noise-free pixel estimate for the pixel of interest located at image coordinates $(x_0,y_0)$. The local region used to obtain the noise-free pixel estimate is shown in more detail in FIG. 4. ZZZ As can be seen from equations (2)–(5) and FIG. 4, the preferred embodiment of the present invention uses a 3×3 local region sampled about the pixel of interest. It should be noted, however, that a different sized local region can be used. For instance, a 5×5 local region might be desirable. Those skilled in the art will note that our proposed framework is easily extended to any such case.

The spatial filtering technique described above can be used for noise estimation and noise removal. As described hereinbelow, the noise free pixel estimate is subtracted from the pixel of interest to form a noise residual image from which an estimate of the noise content can be derived. The present invention also uses the spatial filtering technique to form an enhanced digital image from the noise free pixel estimate values.

Having obtained the noise-free estimate f(x,y) for the pixel of interest, an estimate of the noise n(x,y) can be obtained by rearranging equation (1) as:

$$n(x,y)=g(x,y)-f(x,y) \qquad (9)$$

Thus the noise residual image 107 is obtained by subtracting the noise free pixel estimates from the values of the corresponding pixels of interest.

As described above, the pixel data of the source digital image 101 can be conceptualized as having two components—a signal component relating to photographed objects f(x,y) and a noise component n(x,y). The resulting residual pixel values have statistical properties that have a closer relationship to the noise component of the pixel data of the source digital image 101 than the signal component. Although the noise component can contain sub-components, the stochastic sub-component of the noise component is well modeled by a zero mean Gaussian probability distribution function. To first order, the noise component of the pixel data of the source digital image 101 can be characterized by a standard deviation and a mean value of zero. To second order, standard deviation of the noise component can be modeled as being signal strength and color dependent.

Referring to FIG. 3, a residual statistics accumulator 130 analyzes the residual pixel values and records these values in the form of a set of residual histograms as a function of the color digital image channel and pixel value. Therefore a given residual histogram $H_{ik}$ relates to the $i^{th}$ color digital image channel and the $k^{th}$ pixel value sub-range. For each pixel of interest denoted by $p_{mn}$(corresponding to the $m^{th}$ row and $n^{th}$ column location) in the processed color digital image channel, a histogram bin index k is computed. For example, if the numerical range pixel values is from 0 to 255 there can be as many as 256 useful histograms, i.e. one histogram for each possible numerical pixel value. In general, most noise sources can be characterized as having noise standard deviations that are slow functions of the pixel value. Therefore, the preferred embodiment of the present invention uses 8 histograms to cover the numerical pixel value range of 0 to 255. Thus the calculated histogram index bin and the corresponding sub-range pixel values are given by the following Table (1).

TABLE 1

| histogram bin index | sub-range pixel values | average pixel value |
|---|---|---|
| 0 | 0 to 31 | 16 |
| 1 | 32 to 63 | 48 |
| 2 | 64 to 95 | 80 |
| 3 | 96 to 127 | 112 |
| 4 | 128 to 159 | 144 |
| 5 | 160 to 191 | 176 |
| 6 | 192 to 233 | 208 |
| 7 | 234 to 255 | 240 |

Those skilled in the art will recognize that the present invention can be practiced with digital image pixel data with any numerical range. The number of residual histograms used for each color digital image channel will depend on the accuracy of results required for the particular digital imaging application.

Although each approximate residual histogram records statistical information for a range of pixel values for a given color digital image channel, the residual histogram records the frequency of residual pixel values associated with each pixel of interest $p_{mn}$. Since the expected mean of the distribution of residual pixel values is zero, the residual pixel values exhibit both positive and negative values. Therefore, the approximate residual histogram must record the frequency, i.e. the number of instances of residual pixel values, of all possible instances of residual pixel values. For the example above, the residual pixel values can range from −255 to +255. While is possible to construct residual histograms with as many recording bins as there are possible instances of residual pixel values, in general it is not necessary. For most digital images only a small percentage of residual pixel values exhibit values near the extremes of the possible range. The present invention uses 101 total recording bins for each residual histogram. On of the recording bins corresponds to residual pixel values of 50 and greater. Similarly, one other recording bin corresponds to residual pixel values of −50 and lower. The other 99 recording bins each correspond to a single residual pixel value for the numerical range from −49 to +49.

Referring to FIG. 3, the noise table calculator 140 receives the set of residual histograms and calculates a noise characteristic table. For each of the residual histograms relating to a particular color digital image channel and pixel value range, the noise table calculator 140 derives a noise standard deviation value from the value of the recording cells of the updated residual histogram. This is equivalent to calculating the standard deviation of the noise residual pixel values. The preferred embodiment of the present invention uses equation (10) to calculate the standard deviation value $\sigma_n$ $$\sigma_n = ((1/N)\Sigma_k RC_v(k)(x-x_m)^2)^{1/2} \quad (10)$$

where the variable x represents the average pixel value of the residual pixel values accumulated in the $k^{th}$ recording cell as given by Table (1) and RCv(k) represents the number of residual pixel values accumulated by the $k^{th}$ recording cell.

$$x = V(k) \quad (11)$$

The variable $x_m$ represents the arithmetic mean value of the corresponding residual pixel values given by equation (9) and, $$x_m = (1/N)\Sigma_k x \quad (12)$$

and the variable N represents the total number of residual pixel values recorded by the updated residual histogram given by equation (13).

$$N = \Sigma_k RC_v(k) \quad (13)$$

An alternative embodiment of the present invention performs an alpha-trimmed standard deviation calculation. In this embodiment a first approximation to the standard deviation $\sigma_e$ is calculated using the method described above. The calculation of $\sigma_n$ is then calculated using the only recording cells with corresponding residual pixel values that are within a limited range of zero. The formula for the standard deviation calculation $\sigma_n$ is given by equation (14)

$$\sigma_n = ((1/N)\Sigma_k \gamma RC_v(k)(x-x_m)^2)^{1/2} \quad (14)$$

where the variable $\gamma$ is given by equation (15)

$\gamma = 1$ if $|x| < \alpha\sigma_e$ $\gamma = 0$ if $|x| \geq \alpha\sigma_e$ \quad (15)

where the variable $\alpha$ is set to 3.0. This alternative embodiment of the present invention is more computationally intensive than the preferred embodiment but does yield more accurate results via the rejection of out-lying residual pixel values from adversely contributing to the calculation of the standard deviation $\sigma_n$ value.

Table 2 below is an example of a noise characteristic table present invention.

TABLE 2

| average pixel valve | standard deviation of red channel | standard deviation of green channel | standard deviation of blue channel |
|---|---|---|---|
| 16 | 1.775 | 1.828 | 1.899 |
| 48 | 1.767 | 1.820 | 2.231 |
| 80 | 1.990 | 2.075 | 2.136 |
| 112 | 2.100 | 2.151 | 1.888 |
| 144 | 1.703 | 2.093 | 2.058 |
| 176 | 0.885 | 0.923 | 2.356 |
| 208 | 0.937 | 0.917 | 0.977 |
| 240 | 1.279 | 1.660 | 0.928 |

Those skilled in the art should recognize that the present invention can be practiced with calculated quantities other than the standard deviation that relate to the noise present in digital images. For example, the statistical variance or statistical median can also be derived from the residual histograms and be used to form a table of noise characteristic values. As can be seen from Table 2, the noise characteristic value is reported as a function of the numerical values of the source digital image pixels—i.e. the light intensity values represented in the source digital image. In addition, if the source digital image contains two or more color channels, the noise characteristic values can also be calculated as a function of color and the numerical values of the source digital image pixels (as is the case in Table 2).

The accuracy of the noise characteristic value estimates yielded by the present invention can be improved with additional refinement of the residual pixel values. For example, if the source digital image contains two or more color channels, the residual pixel values for the two or more color channels can be used to calculate a color weighting factor. This color weighting factor can then be used to exclude residual pixel values from the calculation of the noise characteristic value. Those skilled in the art will note that this type of refinement is well documented in the literature and could easily be combined with the present invention.

The present invention uses a set of residual histograms to record the calculated statistics. A set of histograms is an example of a statistical table from which a noise characteristic table can be derived. Thus the set of residual histograms constitutes a statistical table. Those skilled in the art should recognize that the present invention can be practiced with other forms of statistical tables. For example, the residual digital images can be stored and serve as a statistical table.

The calculated noise characteristic table is used in conjunction with spatial filters for the purpose of enhancing the source digital image 101 and thus produce an enhanced digital image 102. A spatial filter is any method which uses pixel values sampled from a local region about a pixel of interest to calculate an enhanced pixel value which replaces the pixel of interest. Those spatial filters which reduce spatial modulation, for at least some pixels in an effort to remove noise from the processed digital image, can be considered noise reduction filters. Those spatial filters which increase spatial modulation, for at least some pixels in an effort to enhance spatial detail noise in the processed digital image, can be considered spatial sharpening filters. It should be noted that it is possible for a single spatial filter to be considered both a noise reduction filter as well as a spatial sharpening filter. The present invention can be used with any digital image processing method which makes uses of a noise characteristic table to produce an enhanced digital image 102. Spatial filters that adjust a processing control parameter as a function of either the color or numerical value of pixels are adaptive spatial filters. The present invention uses a noise reduction filter and a spatial sharpening filter which are responsive to a noise characteristic table.

Referring to FIG. 2, the preferred embodiment of the present invention employs a noise reduction module 22 as part of the image processing method to produce enhanced digital images 102. As such, the source digital image 101 and the noise characteristic table 105 are received by the noise reduction module 22 which produces on output a noise reduced digital image.

It is important to note that for many practical digital imaging image systems, other image processing processors need to be included. As long as these other image processing processors accept a digital image as input and produce a digital image on output, more of these type of image processing modules can be inserted in the image processing chain in between a noise reduction module 22 and a spatial sharpening module 23.

The present invention uses a modified implementation of the Sigma filter, described by Jong-Sen Lee in the journal article *Digital Image Smoothing and the Sigma Filter*, Computer Vision, Graphics, and Image Processing Vol 24, p. 255–269, 1983, as a noise reduction filter to enhance the appearance of the processed digital image. The values of the pixels contained in a sampled local region, n by n pixels where n denotes the length of pixels in either the row or column direction, are compared with the value of the center pixel, or pixel of interest. Each pixel in the sampled local region is given a weighting factor of one or zero based on the absolute difference between the value of the pixel of interest and the local region pixel value. If the absolute value of the pixel value difference is less or equal to a threshold $\epsilon$, the weighting factor if set to one. Otherwise, the weighting factor is set to zero. The numerical constant $\epsilon$ is set to two times the expected noise standard deviation. Mathematically the expression for the calculation of the noise reduced pixel value is given as $$q_{mn} = \Sigma_{ij} a_{ij} p_{ij} / \Sigma_{ij} a_{ij}$$

and $$a_{ij}=1 \text{ if } |p_{ij}-p_{mn}| <= \epsilon$$

$$a_{ij}=0 \text{ if } |p_{ij}-p_{mn}| > \epsilon \quad (16)$$

where $p_{ij}$ represents the $ij^{th}$ pixel contained in the sampled local region, $p_{mn}$ represents the value of the pixel of interest located at row m and column n, $a_{ij}$ represents a weighting factor, and $q_{mn}$ represents the noise reduced pixel value. Typically, a rectangular sampling region centered about the center pixel is used with the indices i and j varied to sample the local pixel values.

The signal dependent noise feature is incorporated into the expression for $\epsilon$ given by equation (17)

$$\epsilon = Sfac\,\sigma_n(p_{mn}) \quad (17)$$

where $\sigma_n$ represents the noise standard deviation of the source digital image evaluated at the center pixel value $p_{mn}$ as described by equations (10) and (14) above. The parameter Sfac is termed a scale factor can be used to vary the degree of noise reduction. The optimal value for the Sfac parameter has been found to be 1.5 through experimentation however values ranging from 1.0 to 3.0 can also produce acceptable results. The calculation of the noise reduced pixel value $q_{mn}$ as the division of the two sums is then calculated. The process is completed for some or all of the pixels contained in the digital image channel and for some or all the digital image channels contained in the digital image. The noise reduced pixel values constitute the noise reduced digital image. The modified implementation of the Sigma filter is an example of a noise reduction filter that uses a noise characteristic table and is therefore an adaptive noise reduction filter which varies the amount of noise removed as a function of the pixel color and numerical value.

Referring to FIG. 2, the preferred embodiment of the present invention employs a spatial sharpening module 23 as part of the image processing method to produce an enhanced digital image 102. As such, the noise reduced digital image and the noise characteristic table 105 are received by the spatial sharpening module 23 which produces on output an enhanced digital image 102.

Although the present invention can be used with any spatial sharpening filter which utilizes a priori knowledge of the noise characteristics to sharpen the spatial detail of the processed digital image. The preferred embodiment uses a modified implementation of the method described by Kwon et al in U.S. Pat. No. 5,081,692. This spatial sharpening method performs an unsharp masking operation by filtering the input digital image with a spatial averaging 2-dimensional Gaussian filter (characterized by a standard deviation of 2.0 pixels) which results in a blurred digital image. The blurred digital image is subtracted from the input digital image to form a high-pass residual. In the method disclosed by Kwon et al. a local variance about a pixel of interest is calculated by using the pixel data from the high-pass residual. Based on the value of the local variance a sharpening factor is adjusted so as to amplify large signals more than small amplitude signals. The amplification factor $\Phi$ is therefore a factor of the local variance v. i.e. $\Phi(v)$.

The present invention modifies the method taught by Kwon et al. to make the amplification factor $\Phi(v)$ a function of the estimated noise, i.e. $\Phi(v,\sigma_n)$. The amplification function f is given by a gamma function, or integral of a Gaussian probability function, as given by equation (18).

$$\phi(v) = \frac{yo + y\text{max}S\varepsilon^{-(\varpi-\varpi_o)2/2\sigma^2}}{\psi o + \psi\mu\alpha\xi\varepsilon^{-(\varpi\mu\alpha\xi-\varpi_o)2/2\sigma^2}} \quad (18)$$

where $y_o$ represents a minimum amplification factor $y_{max}$ represents a maximum amplification factor, $v_{max}$, represents a maximum abscissa value of the variable v, $v_o$ represents a transition parameter and s represents a transition rate parameter. The variable $v_o$ is a function of the noise standard deviation value $\sigma_n$ as per equation (19)

$$v_o = Sfac_2\sigma_n(p_{mn}) \quad (19)$$

where the scaling factor $Sfac_2$ determines the sensitivity of the sharpening sensitivity to the noise and the noise standard deviation value $\sigma_n$ is as described above in equations (10) and (14). The optimal values for the variables used in equation (19) depend on the digital imaging application. The present invention uses a value of 1.0 for $y_o$ which results in no spatial sharpening for noisy regions. A value of 3.0 is used for $y_{max}$, however, this variable is sensitive to user preference with values ranging from 2.0 to 4.0 producing acceptable results. The value of $Sfac_2$ should be set to between 1.0 and 2.0 with 1.5 as optimal. The variables should be set to values in the range from $v_o/2$ to $v_o/10$ for reasonable results. The variable $v_{max}$, should be set to a value much larger than the expected noise, e.g. 20 time the value of $\sigma_n$.

While the preferred embodiment of the present invention calculates a noise characteristic table and then subsequently uses the noise characteristic table to produce an enhanced digital image, some digital imaging systems can be configured to separate the calculation phase from the enhancement phase. In an alternative embodiment of the present invention, the calculated noise characteristic table is stored with the source digital image 101 as meta-data, i.e. non-pixel information. The source digital image 101 with meta-data can be transmitted to a remote site or stored for safe keeping to be used at a later time or another site. Any of the above mentioned noise characteristic tables can be stored as meta-data. In general a noise characteristic table requires much less memory storage than a set of residual histograms. However, a set of residual histograms can be stored with the source digital image 101 as meta-data.

The present invention uses a spatial filter to calculate a residual digital image 107 from a source digital image 101 and derives noise characteristic values from the residual digital image 107. Those skilled in the art will recognize that the present invention can be used in conjunction with spatial masking techniques, such as the method described by Snyder et al. in commonly-assigned U.S. Pat. No. 5,923,775, to improve the statistical accuracy of the method.

The four direction spatial filter described above can be used as a noise reduction filter. In this embodiment of the present invention, the final noise free pixel estimates are calculated for each pixel in the source digital image 101. The final noise free pixel estimates therefore forms a noise reduced digital image, i.e. a representation of the source digital image 101 with noise removed. An advantage of the present invention over other noise reduction method is the fact that the present invention does not require a priori knowledge of the noise characteristics of the source digital image 101.

The invention has been described in detail with particular reference to certain preferred embodiments thereof, but it will be understood that variations and modifications can be effected within the spirit and scope of the invention.

PARTS LIST

10*a* image capture device
10*b* image capture device
10*c* image capture device
20 digital image processor
22 noise reduction module
23 spatial sharpening module
30*a* image output device
30*b* image output device
40 general control computer
50 monitor device
60 input control device
70 offline memory device
101 source digital image
102 enhanced digital image
105 noise characteristic table
107 residual digital image
110 noise estimation module
120 residual transform module
130 residual statistic accumulator
140 noise table calculator

What is claimed is:

1. A method of estimating the noise in a digital image for use in subsequent image processing, comprising the steps of:
   a) receiving a source digital image having a plurality of pixels;
   b) selecting a pixel of interest;
   c) providing a plurality of orientations for the pixel of interest;
   d) using gradient analysis on the source digital image and the plurality of orientations to select the most suitable orientation for estimating noise for the pixel of interest by calculating two or more directional intensity gradient values for the pixel of interest wherein each directional intensity gradient value corresponds to a different spatial orientation about the pixel of interest;
   e) using the selected orientation in the pixel of interest to determine a noise-free pixel estimate for the pixel of interest; and
   f) repeating steps b)–e) for other pixels of interest and using the noise-free pixel estimates to calculate a noise characteristic value representing the noise estimate for the source digital image.

2. The method of claim 1 wherein step e) includes calculating a residual pixel value using the noise-free pixel estimate and the value of the pixel of interest.

3. The method of claim 2 wherein step f) includes using the residual pixel values to calculate the noise characteristic value.

4. The method of claim 1 wherein each directional intensity gradient value is independent from the value of the pixel of interest.

5. The method of claim 3 further including calculating the residual pixel value as the difference between the noise-free pixel estimate and the value of the pixel of interest.

6. The method of claim 1 wherein the directional intensity gradient value of minimum value is used to select the most suitable orientation for the pixel of interest.

7. The method of claim 1 wherein Sobel spatial filters are used to calculate the directional intensity gradient values.

8. The method of claim 1 wherein Prewitt spatial filters are used to calculate the directional intensity gradient values.

9. The method of claim 1 wherein step f) includes calculating the noise characteristic value as a function of the numerical values of the source digital image pixels.

10. The method of claim 1 wherein step f) includes calculating the noise characteristic value as a function of color and the numerical values of the source digital image pixels.

11. The method of claim 2 wherein step f) includes calculating the noise characteristic value as the standard deviation of the noise residual pixel values.

12. The method of claim 1 further includes using the noise characteristic value to remove noise from the source digital image to produce an enhanced digital image.

13. The method of claim 1 further includes using the noise characteristic value to sharpen the spatial detail of the source digital image to produce an enhanced digital image.

14. The method of claim 1 wherein each of the plurality of orientations for the pixel of interest intersect with the pixel of interest.

* * * * *